United States Patent
Gunn, III

(10) Patent No.: US 7,194,166 B1
(45) Date of Patent: *Mar. 20, 2007

(54) USE OF WAVEGUIDE GRATING COUPLERS IN AN OPTICAL MUX/DEMUX SYSTEM

(75) Inventor: Lawrence C. Gunn, III, Encinitas, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/212,858

(22) Filed: Aug. 26, 2005

Related U.S. Application Data

(60) Provisional application No. 60/604,797, filed on Aug. 26, 2004.

(51) Int. Cl.
*G02B 6/34* (2006.01)
*G02B 6/26* (2006.01)
*G02B 6/42* (2006.01)

(52) U.S. Cl. ............... 385/37; 385/31; 385/39; 385/47; 385/50

(58) Field of Classification Search .......... 385/37
See application file for complete search history.

(56) References Cited

U.S. PATENT DOCUMENTS

| | | | |
|---|---|---|---|
| 5,345,456 A * | 9/1994 | Dai et al. .............. 372/22 |
| 5,371,817 A * | 12/1994 | Revelli et al. .......... 385/44 |
| 5,488,681 A * | 1/1996 | Deacon et al. .......... 385/37 |
| 5,621,715 A * | 4/1997 | Ohyama ............... 369/112.12 |
| 6,406,196 B1 * | 6/2002 | Uno et al. ............ 385/89 |
| 6,452,187 B1 * | 9/2002 | Claiborne et al. ...... 250/370.12 |
| 2002/0008215 A1* | 1/2002 | Evans ................ 250/559.13 |
| 2002/0041734 A1* | 4/2002 | Worchesky et al. ...... 385/37 |

\* cited by examiner

*Primary Examiner*—Frank G. Font
*Assistant Examiner*—Ryan Lepisto
(74) *Attorney, Agent, or Firm*—Fernandez & Associates, LLP

(57) ABSTRACT

A group of waveguide grating couplers is disposed on a semiconductor substrate. The grating couplers are all within a spot illuminated on the substrate by a light from an optical fiber. The light propagating in the fiber is wavelength division multiplexed (WDM) and consists of several channels. Within the group of grating couplers, at least one grating coupler is designed to be tuned to each of the channels. The group of grating couplers demultiplexes the channels propagating in the fiber. A group of waveguide grating couplers can also be used to multiplex several channels of light into an optical fiber. Single mode and multimode fiber can be used to carry the multiplexed channels of light in an optical multiplexing and demultiplexing system.

12 Claims, 7 Drawing Sheets

700  705

USE OF WAVEGUIDE GRATING COUPLERS IN AN OPTICAL MUX/DEMUX SYSTEM

CROSS-REFERENCE TO RELATED APPLICATIONS

This application claims priority from U.S. Provisional application No. 60/604,797 filed Aug. 26, 2004.

FIELD OF THE INVENTION

The present invention relates to the use of waveguide grating couplers in an optical multiplexing and demultiplexing system, where the multiplexed signals propagate through optical fibers.

BACKGROUND OF THE INVENTION

Optical fibers have been widely used in high speed communications links. Optical links using fiber optics have many advantages compared to electrical links: large bandwidth, high noise immunity, reduced power dissipation and minimal crosstalk. Fiber optic communications links can have data transmission capacity in the terabit per second range. In communications systems where optical fibers are used to transport optical communications signals, various optoelectronic devices are used to control, modify and process the optical signals.

Wavelength division multiplexing (WDM) is an essential technique for the full utilization of the large bandwidth available for use in optical fibers in optical communications systems. Various technologies and devices have been developed for the multiplexing and demultiplexing of many channels of light in a WDM system. Devices such as thin film interference filters, fused fiber couplers, Mach-Zender interferometers, fiber Bragg gratings, bulk diffraction gratings, optical circulators, arrayed waveguide gratings (AWG) and other devices have been used to fabricate multiplexers and/or demultiplexers.

However, there are drawbacks associated with these WDM technologies. Many of these systems, such as the MZI, Bragg gratings and AWG are incompatible with multi-mode optical fibers. Thin film filters and bulk diffraction grating can be used with multi-mode fibers, but this requires use of free-space optical systems, which require more parts and precise alignment, resulting in costly solutions.

Light emitted from multi-mode fibers (MMF) differs from that in single mode fibers (SMF) in two key ways. First, the spot size of the light from a multi-mode fiber is larger than a single mode fiber. MMF typically has a 50 or 62.5 micron core, whereas SMF typically has an 8–10 micron core. While these are typical dimensions, it is commonly understood that other dimensions can be employed for both types of fiber. The second main difference is in the modal distribution of the light. MMF has light that exits the fiber in a large number of different spatial states and two fundamental polarization states, whereas SMF has a single spatial state and two fundamental polarization states. When the large number of spatial states present in MMF are coupled into a waveguide based WDM filter, often light in the higher order modes is lost, due to the preference of WDM filters to be designed for single mode input. Thus, waveguide based WDM filters are not easily used in systems utilizing MMF. It would be ideal to have a WDM filter that worked for MMF, and still have the benefits of waveguide based operation, such as planar construction and the ability to incorporate waveguide photodetectors. Another ideal property would be a device capable of operation in both MMF and SMF systems.

Waveguide grating couplers are well known devices for coupling light from a waveguide mode to an external mode, often a fiber or a free-space beam. One property of these grating couplers is a coupling passband between the external mode (fiber or free space), and the waveguide modes. Another property of waveguide grating couplers is the polarization dependence of the coupling. There are designs well known by those skilled in the art to operate only on a single polarization state. Examples of waveguide grating couplers are discussed in U.S. patent application Ser. No. 10/776,475 entitled "Optical Waveguide Grating Coupler" filed on Feb. 11, 2004 and U.S. patent application Ser. No. 10/776,146 entitled "Optical Waveguide Grating Coupler with Scattering Elements of Varying Configurations," filed on Feb. 11, 2004, which are incorporated herein by reference.

In addition, another class of waveguide grating coupler treats multiple polarizations simultaneously, though in different manners. Examples of polarization splitting grating couplers are discussed in U.S. Pat. No. 6,788,847, entitled "Photonic Input/Output Port" and U.S. patent application Ser. No. 10/734,374 entitled "Polarization Splitting Grating Coupler' filed on Dec. 12, 2003, all of which are incorporated herein by reference.

A final category of waveguide grating coupler is one that is designed to perform identically on each polarization state. A key property of waveguide grating couplers is that they can be lithographically defined in desired orientations, shapes and sizes. This allows construction of a number of different grating couplers in a region of a waveguide.

Integrated optoelectronic devices made of silicon are highly desirable since they can be fabricated in the same foundries used to make VLSI integrated circuits. Optoelectronic devices integrated with their associated electronic circuits can eliminate the need for more expensive hybrid optoelectronic circuits. Optoelectronic devices built using a standard CMOS process have many advantages, such as: high yields, low fabrication costs and continuous process improvements.

Recent developments in the fabrication of low loss, high speed grating couplers on silicon or SOI substrates have provided the possibility of new applications for such devices.

SUMMARY OF THE INVENTION

A group of waveguide grating couplers is disposed on a semiconductor substrate. The grating couplers are all within a spot illuminated on the substrate by a light from an optical fiber. The light propagating in the fiber is wavelength division multiplexed (WDM) and consists of several channels. Within the group of grating couplers, at least one grating coupler is designed to be tuned to each of the channels. The group of grating couplers demultiplexes the channels propagating in the fiber. A group of waveguide grating couplers can also be used to multiplex several channels of light into an optical fiber. Single mode and multimode fiber can be used to carry the multiplexed channels of light in an optical multiplexing and demultiplexing system.

DETAILED DESCRIPTION

Figure 1:
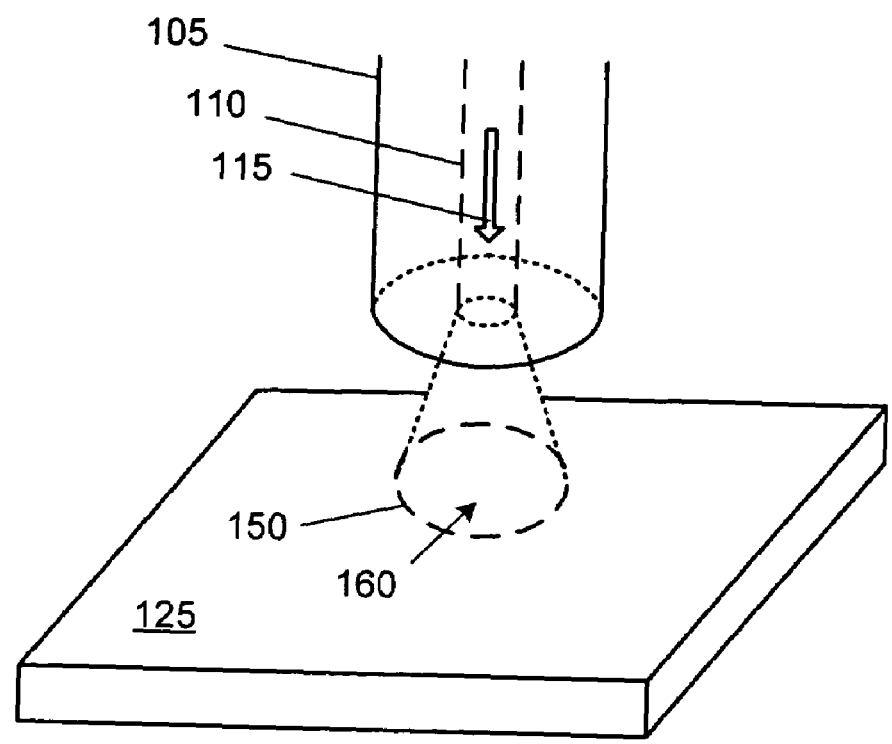
FIG. 1 is a diagram of an oblique view of an optical fiber coupled to a grating coupler demultiplexer, according to one embodiment of the present invention.

FIG. 1 is a diagram of an oblique view of optical fiber 105 optically coupled to grating coupler demultiplexer 160, according to one embodiment of the present invention. Grating coupler demultiplexer 160 is made of several waveguide grating couplers disposed on substrate 125. The substrate 125 can be an integrated circuit, a chip, a die or a wafer. Various types of Group IV semiconductors, such as silicon, germanium, diamond, silicon carbide, silicon germanium, or strained silicon can be used. Additionally, compound semiconductors such as: gallium arsenide, gallium nitride, indium phosphide, indium gallium arsenide phosphide, indium gallium arsenide, or other related Group III-V or Group II-VI compound semiconductors can be used as a substrate. Alternatively, dielectric substrates, such as quartz, sapphire, silica, or other glasses can be used. A combination of semiconductor and dielectric is also possible, such as a silicon-on-insulator (SOI) wafer or a silicon-on-sapphire (SOS) wafer. Alternatively, plastic or polymer materials can be employed as a substrate. In many cases, the substrate will comprise one or more materials, such as a silica on silicon wafer, or polymer waveguides deposited on top of glass substrates.

The grating couplers are all within a spot 150 illuminated on substrate 125 by light 115 from optical fiber 105. The light 115 is substantially confined in a core 110. The spot 150 will have the shape of a circle if the fiber 105 is normal to the surface of substrate 125. If the fiber 105 is at an angle with respect to the normal to the substrate, then the spot 150 will have an elliptical shape.

The fiber 105 can be SMF, or MMF depending on the application. Also, it's important to note that while it's often advantageous to have the light from the fiber directly illuminate the grating couplers, there are other conditions where it is preferable to illuminate the grating couplers with an image of the fiber mode, as conveyed by lenses, mirrors, prisms, other waveguides or system made from these components, such as collimators. These techniques and others are commonly known to those skilled in the art. In these configurations, the fiber can be more remotely located from the substrate than shown, and use of a beam turning device, such a mirror or reflector allows the fiber to be oriented differently to the substrate. The aspect of the incoming light that's truly important is that it can be projected in a defined spot on the substrate. Since a fiber is a common way to do this, it is used in all subsequent examples, although it should be well understood that there are a number of ways to achieve the equivalent optical function.

Optical fiber 105 is shown in FIG. 1, but the present invention can be understood as functioning with a general purpose, bidirectional optical port above the substrate 125, and such an optical port can include optical elements, such as lenses, etx., as discussed previously herein.

For the purpose of simplifying the terminology herein, the term "grating coupler" is understood to mean "waveguide grating coupler."

Light 115 carries several wavelength division multiplexed channels, where each channel has a unique center wavelength, as is well known in WDM systems. To demultiplex the channels contained in the optical beam 115, one of the grating couplers within illuminated spot 150 will have a period designed to match the center wavelength of one of the channels in optical beam 115. Each grating coupler couples one wavelength of light with a particular center frequency from optical beam 115 into a waveguide on the substrate 125. The output of each of the grating couplers in grating coupler demultiplexer 160 is one of the demultiplexed channels.

Optical fibers such as single mode fiber (SMF) and multimode fiber (MMF) can be optically connected to grating coupler demultiplexer 160. Because MMF typically has a core diameter of 50 or 62.5 microns, it can provide a larger illuminated spot 150 on substrate 125, as compared to the smaller illuminated spot provided by a SMF fiber with a typical core diameter of 8–10 microns, particularly in the case where the end of the fiber 105 is positioned very close to, or nearly at the surface of substrate 125, or it can be projected there by an optical system placed between the fiber and the substrate. If a larger spot 150 size is needed, then fiber 105 can be positioned further away from substrate 125. A larger separation between the fiber 105 and the substrate 125 can increase the size of illuminated spot 150, but with a resultant loss in optical power density for the light incident on the surface of substrate 125. Alternatively, the optical system between the fiber and substrate can be configured for a larger spot size, for example by defocusing the lenses involved, or moving further away from an intermediate waveguide. Various type of grating couplers can be used in the present invention as may be required for a particular use, such as: a single polarization grating coupler, a polarization splitting grating coupler or a polarization insensitive grating coupler.

It should also be understood that an optical system operates reciprocally, meaning that an optical demultiplexing system can almost always be operated in reverse as an optical multiplexing system, and vice-versa. While a number of examples in this application refer to only one of these operations, it's commonly understood that both operations are possible with the same device.

Figure 2:
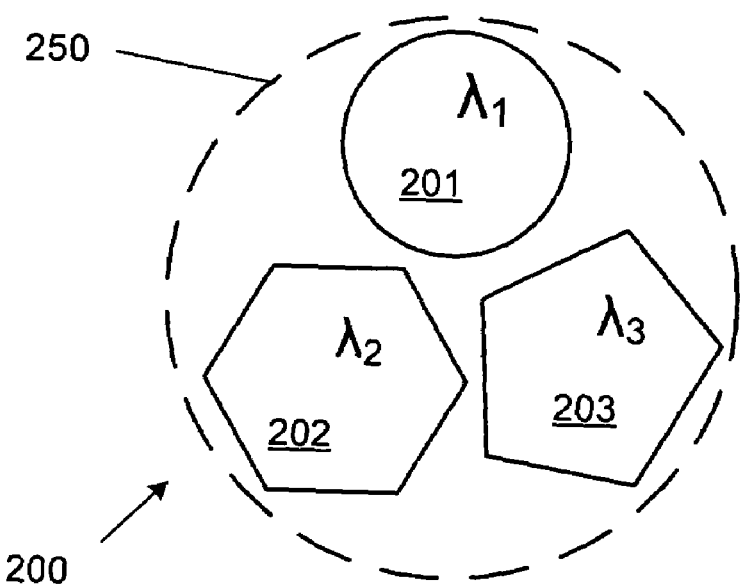
FIG. 2 is a top view of a grating coupler demultiplexer, according to one embodiment of the present invention.

FIG. 2 is a top view of grating coupler demultiplexer 200, according to one embodiment of the present invention. Grating coupler demultiplexer 200 includes three grating couplers 201, 202 and 203, each tuned to respective wavelengths $\lambda_1$, $\lambda_2$ and $\lambda_3$. However, any number of grating couplers and wavelengths can be used, limited only by the size of the spot, the number of grating couplers per wavelength, and the size of the grating couplers. During the design of grating coupler demultiplexer 200, the type, size and shape of each grating coupler can be chosen as may be needed for the requirements of a particular application, such as WDM channel spacing and density, as required by the application. The output of each of the grating couplers in grating coupler demultiplexer 200 is one of the wavelengths contained in the optical beam coupled to illuminated spot 250.

Figure 3:
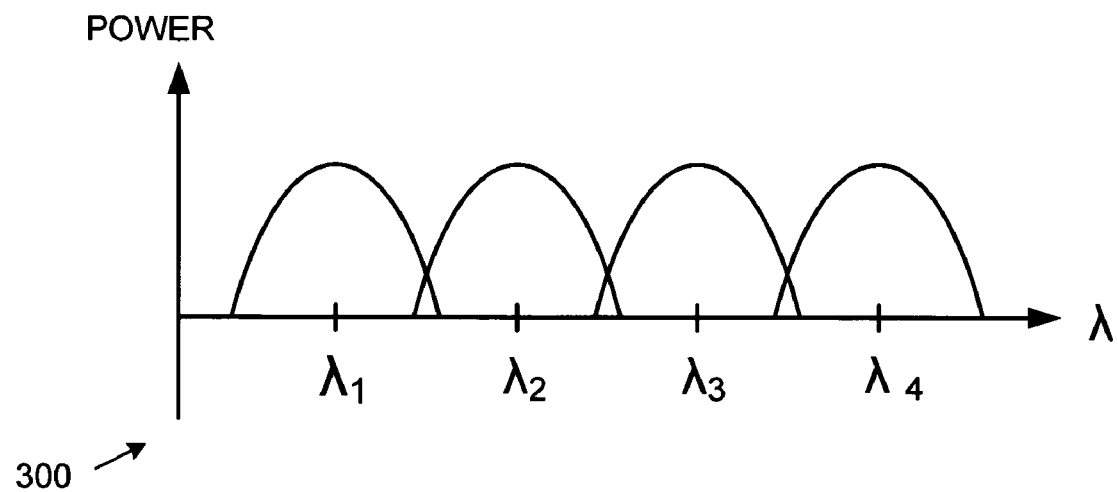
FIG. 3 is a graph of channel spacing for an exemplary four channel WDM system.

FIG. 3 is a graph 300 of channel spacing for an exemplary four channel WDM system with center wavelengths $\lambda_1$, $\lambda_2$, $\lambda_3$ and $\lambda_4$. The spacing between the channels and rolloff of the coupling wavelengths should be sufficient to limit crosstalk to tolerable levels. Each grating coupler in a grating coupler demultiplexer can be designed to provide a high degree of isolation from adjacent channels. The center wavelength and bandwidth of each channel to be demultiplexed by the grating coupler demultiplexer can be designed to be compatible with the type of WDM system, which will incorporate the grating coupler demultiplexer.

In some embodiments, each of the wavelengths $\lambda_1$, $\lambda_2$, $\lambda_3$ and $\lambda_4$ could be separated by about 20 nm, where at least one grating coupler is designed to couple to each of the four wavelengths shown in FIG. 3.

In other embodiments, each grating coupler could be configured to simultaneously couple more than one wavelength. For example, a number of wavelengths separated by 1 nm could be simultaneously coupled as a group by a grating coupler, while another group with a center wavelength can be spaced about 20 nm away from the first group of wavelengths. Each of the groups of wavelengths could couple to their respective grating couplers.

Figure 4:
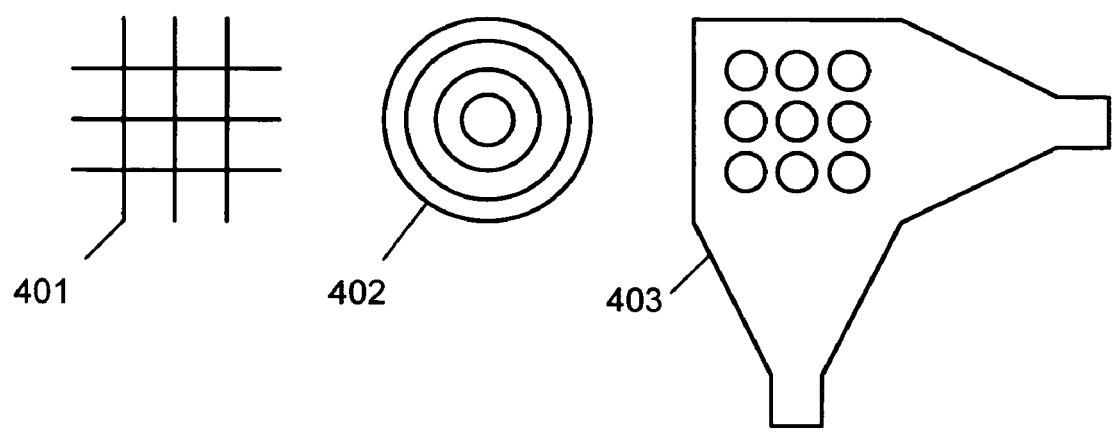
FIG. 4 is a top view of three types of grating couplers, which can be used as part of a grating coupler demultiplexer, according to various embodiments of the present invention.

FIG. 4 is a top view of three exemplary types of grating couplers, which can be used as part of a grating coupler demultiplexer of the present invention. Grating 401 is a crossed grating. Grating 402 is made of circles of light scattering elements. Grating 403 is a polarization splitting grating coupler made of diffractive holes. The polarization sensitivity of the grating couplers fabricated for a particular application have to match the polarization characteristics of the optical fiber connected to the grating coupler demultiplexer. If both polarizations of light on a channel at a given center wavelength are to be processed separately, then a polarization splitting grating coupler has to be designed for that center wavelength. If both polarizations of light at a particular wavelength have to be processed identically, then the grating coupler designed for that wavelength has to treat both polarizations in the same manner, i.e., the grating coupler has to be polarization insensitive.

Figure 5:
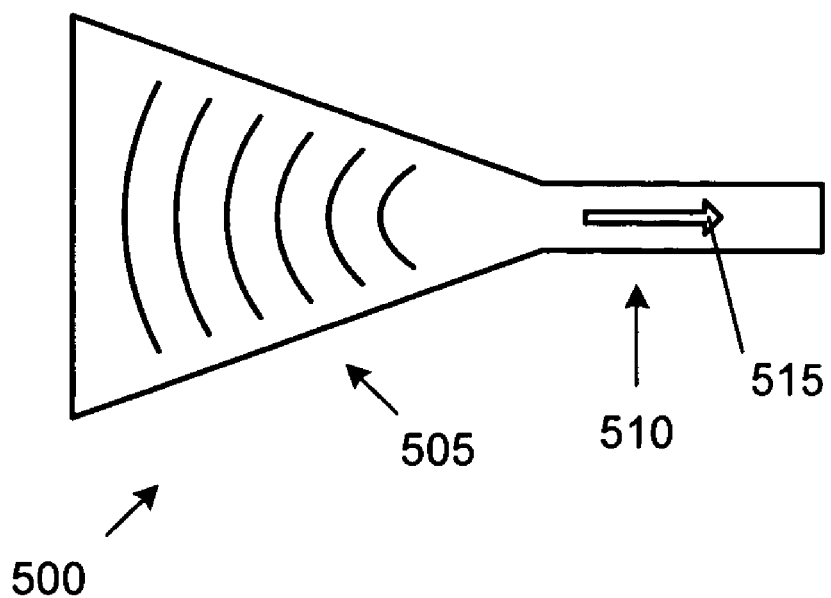
FIG. 5 is a top view of a grating coupler that can be used as part of a grating coupler demultiplexer, according to one embodiment of the present invention.

FIG. 5 is a top view of grating coupler 500 constructed on slab waveguide 505 connected to an optical waveguide 510. Waveguide 510 can direct light 515 to other optical or optoelectronic devices, such as a photodetector on or off the substrate, as may be needed for further processing. Grating coupler 500 is one example of a grating coupler that can be used as part of a grating coupler demultiplexer of the present invention. While this grating coupler shows light being focused into a smaller waveguide, that is not a necessary component of the invention in all circumstances.

Examples of optical waveguides are discussed in the following patents or patent applications: U.S. Pat. No. 6,834,152, entitled "Strip Loaded Waveguide with Low Index Transition Layer;" U.S. patent application Ser. No. 10/242,136 filed on Sep. 10, 2001, entitled "Strip Loaded Waveguide Integrated with Electronics Components," U.S. patent application Ser. No. 10/600,804 filed on Jun. 19, 2002, entitled "Integrated Dual Waveguides," U.S. patent application Ser. No. 10/606,297 filed on Jun. 24, 2003 "CMOS Process Silicon Waveguides" and U.S. patent application Ser. No. 11/146,940 filed on Jun. 7, 2005 entitled "Segmented Waveguide Structures," all of which are incorporated herein by reference.

Figure 6:
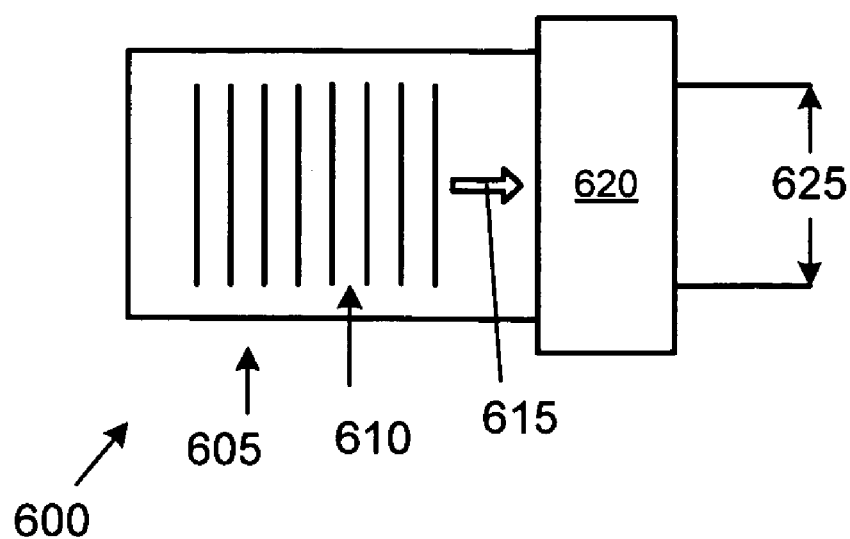
FIG. 6 is a top view of a grating coupler connected to a photodetector, which can be part of a grating coupler demultiplexer, according to another embodiment of the present invention.

FIG. 6 is a top view of optical photodetector 620 coupled to grating coupler 600 fabricated on slab waveguide 605. Grating coupler 600 is fabricated on slab waveguide 605 and the output of grating coupler 600 is coupled to photodetector 620. Light scattering elements 610 of grating coupler 600 direct light 615 to photodetector 620, which produces electrical output 625. Electrical output 625 is proportional to the optical power of the light conveyed at the center wavelength for which grating coupler 600 is designed. The electrical output 625 can then be connected to other electrical devices on or off the substrate for further processing. Grating coupler 600 is another example of a grating coupler that can be used as part of a grating coupler demultiplexer of the present invention.

Figure 7:
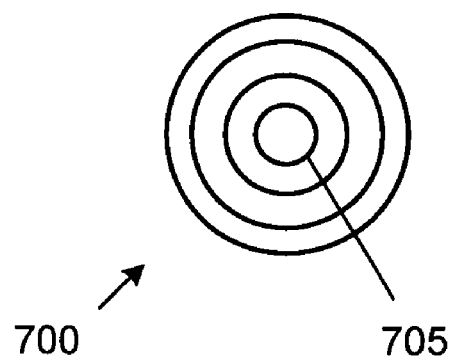
FIG. 7 is a top view of a circular type grating coupler with an photodetector in the center of the grating coupler, which can be used as part of a grating coupler demultiplexer, according to another embodiment of the present invention.

FIG. 7 is a top view of circular type grating coupler 700 with optical power detector 705 in the center of grating coupler 700, which can be used as part of a grating coupler demultiplexer, according to another embodiment of the present invention. In alternate embodiments, a photodetector ring can surround a circular type grating coupler. While this particular example is shown as perfectly circular, it could also be realized by an oval or elliptical, or similar shape, which could be useful when the optical input is present at an angle normal to the surface.

Figure 8:
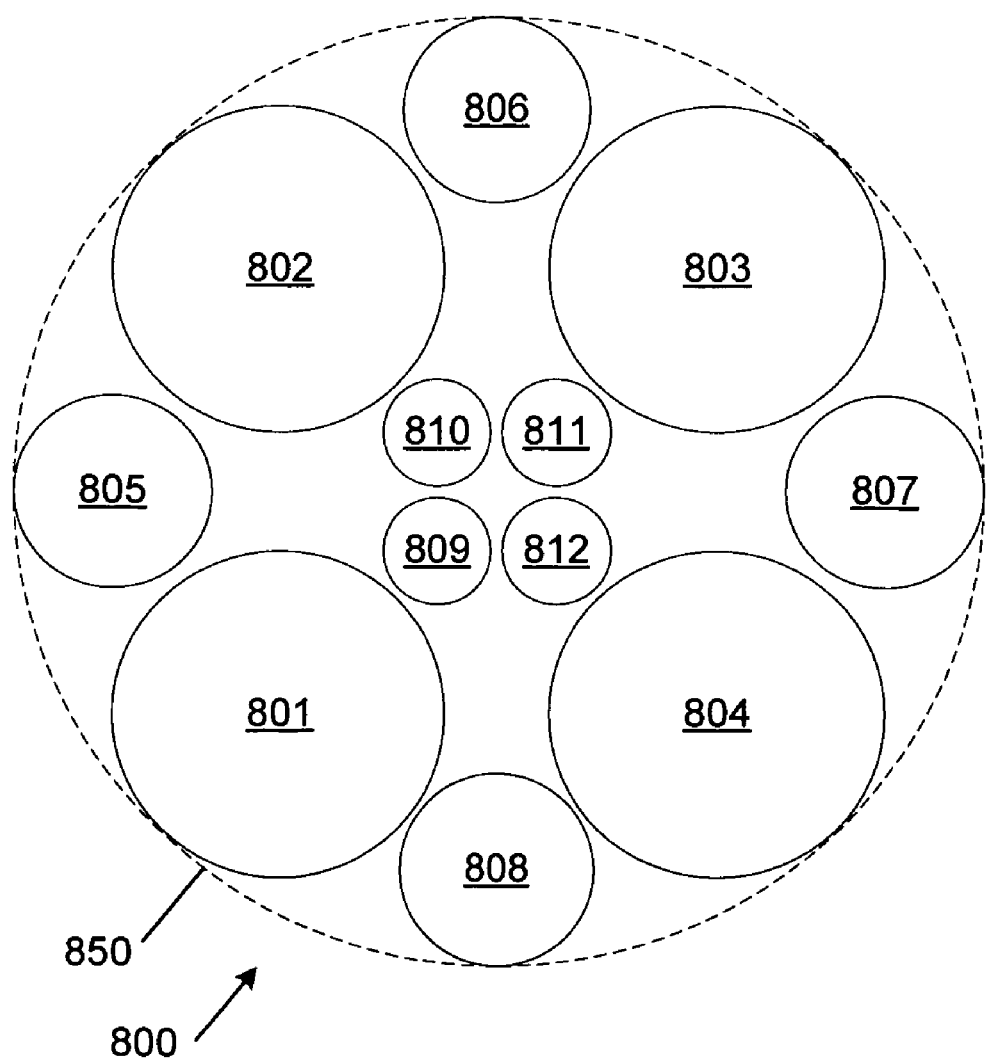
FIG. 8 is a top view of a grating coupler demultiplexer, according to one embodiment of the present invention.

FIG. 8 is a top view of grating coupler demultiplexer 800, according to one embodiment of the present invention. Grating coupler demultiplexer 800 includes grating couplers 801 to 812, of various sizes and located in different sections of the illuminated spot 850. The arrangement of grating couplers within spot 850 can be done in order to maximize the efficiency of the collection of incident light and to provide the desired polarization characteristics of the grating coupler demultiplexer.

Figure 9:
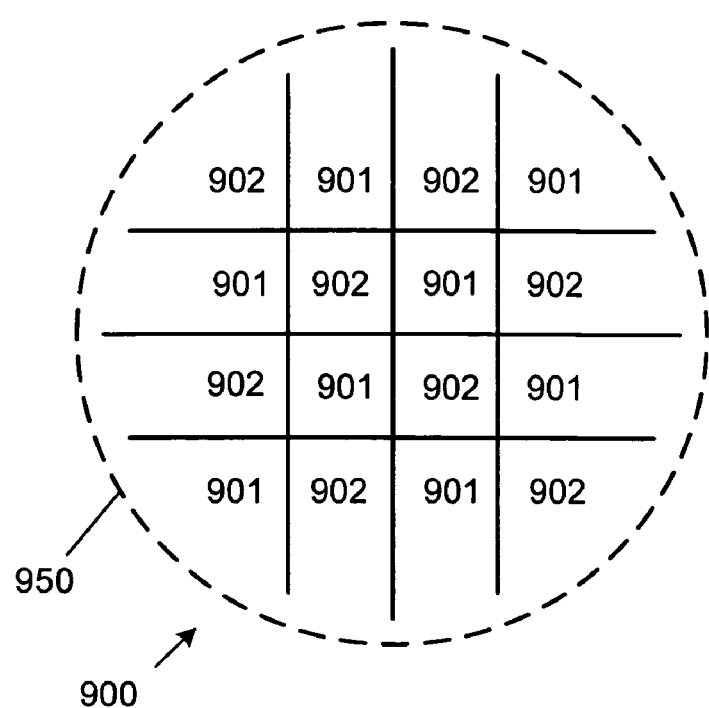
FIG. 9 is a top view of a two wavelength grating coupler demultiplexer, according to another embodiment of the present invention.

FIG. 9 is a top view of a two wavelength grating coupler demultiplexer 900, according to another embodiment of the present invention. Grating coupler demultiplexer 900 is fabricated of two sets of grating couplers 901 and 902, with many versions of each grating coupler in various places within illuminated spot 950. Each of the grating couplers 901 and 902 are tuned to the two respective center wavelengths. The outputs of each set of grating couplers 901 and 902 are summed together and then connected to other devices on or off the substrate for further processing. The number of wavelengths demultiplexed by a grating coupler demultiplexer of the present invention is determined during the design of the grating coupler demultiplexer and the system that will use the grating coupler demultiplexer.

It is possible to construct a demultiplexing system that is polarization insensitive by using a combination of single polarization grating couplers aimed at the two fundamental polarization modes of each wavelength. This is advantageous when the design of the single polarization grating coupler is simple, and sufficiently small enough to be replicated numerous times across the illuminated spot.

Figure 10:
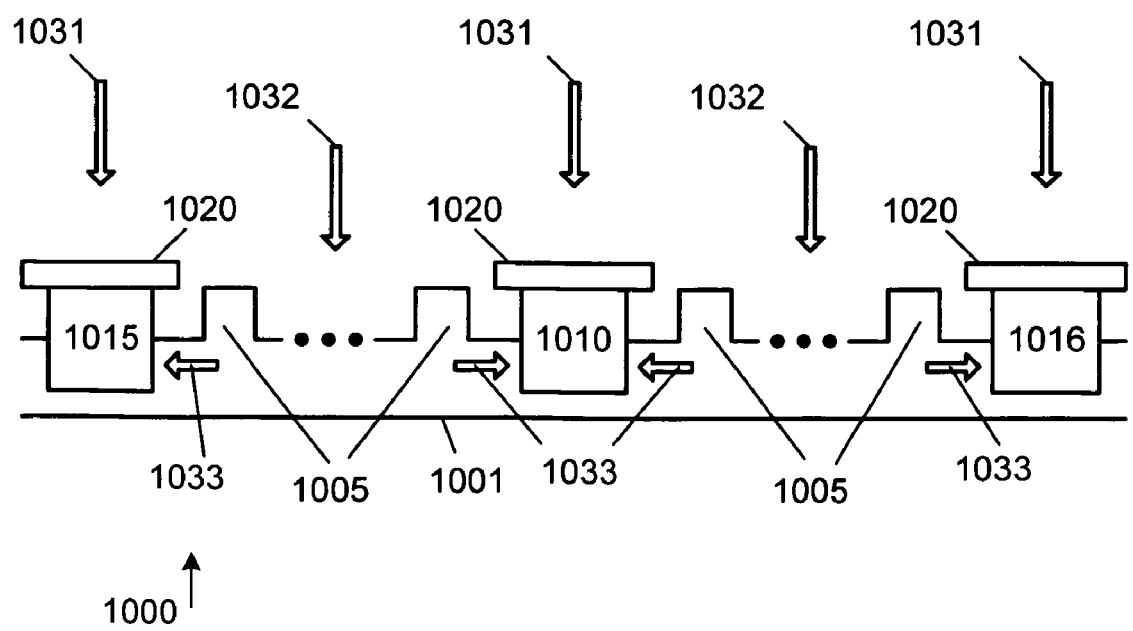
FIG. 10 is a cross sectional view of a circular grating coupler, which is part of a grating coupler demultiplexer, according to an alternate embodiment of the present invention.

FIG. 10 is a cross sectional view of circular grating coupler 1000, which is part of a grating coupler demultiplexer, according to an alternate embodiment of the present invention. Grating coupler demultiplexer 1000 includes concentric light scattering rings 1005 on semiconductor substrate 1001. Light 1032 is incident on the surface of grating coupler 1000 from an optical fiber (not shown in FIG. 10) above grating coupler 1000. Grating coupler 1000 includes a slab waveguide in substrate 1001 to direct incident light 1032 into light 1033 towards photodetectors 1010, 1015 and 1016. Photodetector 1010 is located in the center of grating coupler 1000, as was shown, for example, in FIG. 7. Photodetectors 1015 and 1016 are part of a ring of photodetectors that encircle grating coupler 1000. Alternatively, the photodetector ring around grating coupler 1000 may be a single photodetector, which includes sections 1015 and 1016 seen in FIG. 10.

All the photodetectors in grating coupler 1000 are covered by mirrors 1020, which prevent incident light 1031 of any wavelength from affecting the operation of the photodetectors. Only the waveguided light 1033 of the desired center frequency from grating coupler 1000 reaches the photodetectors. The outputs of all the photodetectors in grating coupler 1000 are summed together to form a total output for each grating coupler 1000. In alternate versions of grating coupler 1000, the photodetector used may be only a photodetector in the center of grating coupler 1000 or only a photodetector arranged in a ring around grating coupler 1000.

If the photodetectors are made from silicon, light in the silicon absorption band can be used. But if the grating couplers are larger in size, then the absorption of light by the silicon may result in significant loss of light in such a grating coupler. With such larger grating couplers, then the wavelengths of light that are in the silicon transparent bands are preferred.

Substrate 1001 can be a SOI, silicon or other semiconductor. If substrate 1001 is silicon, then the photodetectors can be bulk silicon detectors in the substrate.

Examples of photodetectors are discussed in the following U.S. patent applications: U.S. patent application Ser. No. 10/600,563, filed on Jun. 19, 2003 and entitled "Waveguide Photodetector with Integrated Electronics," U.S. patent application Ser. No. 11/177,132, filed on Jul. 7, 2005 and entitled "Germanium Silicon Heterostructure Photodetectors" U.S. patent application Ser. No. 11/177,191, filed on Jul. 7, 2005 and entitled "Integrated Avalanche Photodetector" and U.S. patent application Ser. No. 11/177,133, filed on Jul. 7, 2005 and entitled "Germanium Integration," all of which are incorporated herein by reference.

Figure 11:
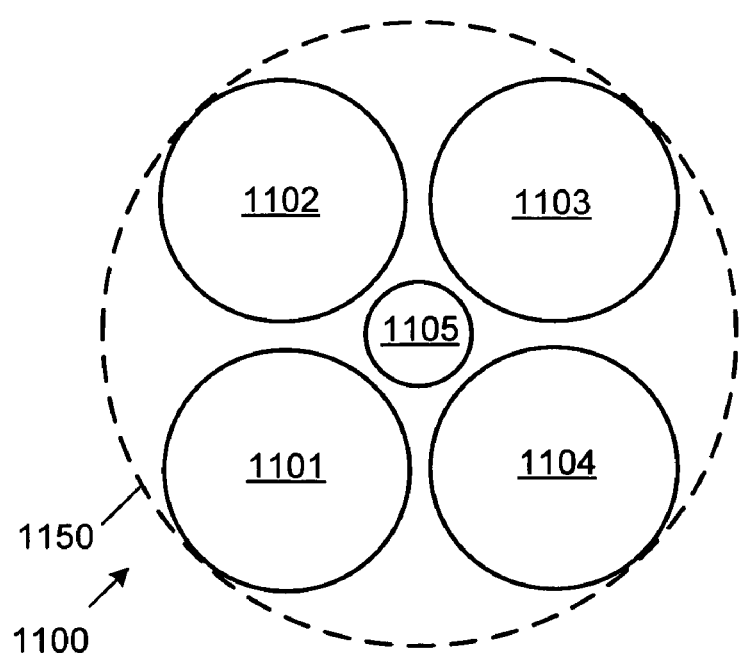
FIG. 11 is a top view of a grating coupler demultiplexer, according to another embodiment of the present invention.

FIG. 11 is a top view of exemplary grating coupler demultiplexer 1100, according to another embodiment of the present invention. Grating coupler demultiplexer 1100 includes grating couplers 1101, 1102, 1103, 1104 and 1105 in illuminated spot 1150 with a diameter of 50 microns. Grating coupler demultiplexer 1100 can be coupled to multimode fiber with a 50 micron core. Each of the five grating couplers can be tuned to a different central wavelength, with the smaller grating coupler 1105 used to carry a control signal. Grating coupler 1105 can be smaller than the others, since less sensitivity is required for a low data rate control signal. Grating coupler demultiplexer 1100 can use circular grating couplers for polarization insensitivity with, for example, germanium heterojunction photodetectors in the middle of the grating couplers. The grating couplers can be formed in a SOI substrate by a partial etch process.

As discussed previously, photodetectors can be located either in the center of the grating couplers or around the grating couplers in a ring or in both locations. The electronic circuits needed to interface to the photodetectors can be located within the unused "white space" of the grating coupler demultiplexer or around the edge of the grating coupler demultiplexer.

Figure 12:
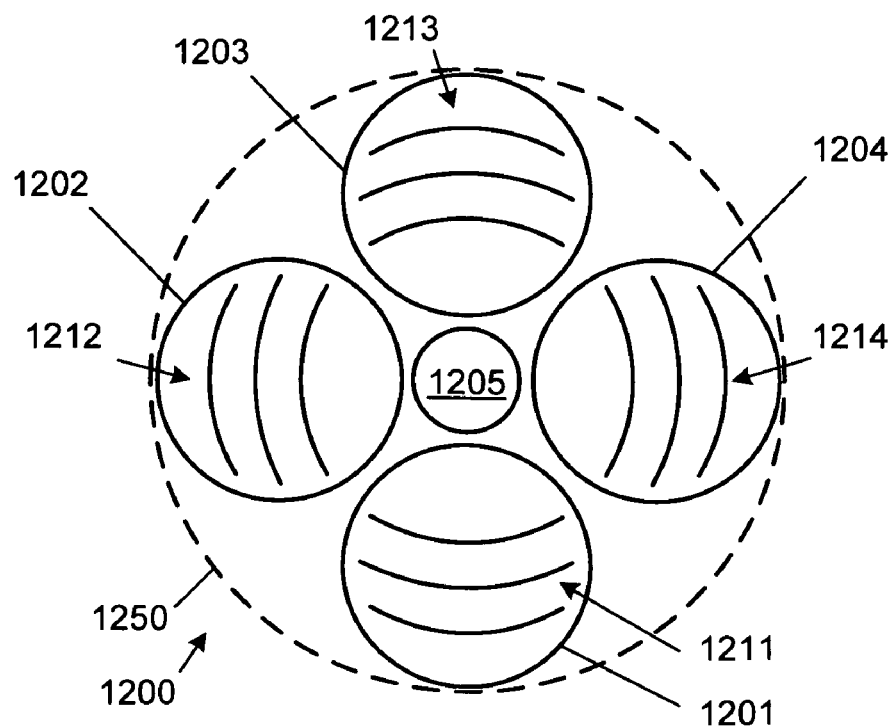
FIG. 12 is a top view of a grating coupler demultiplexer, according to an alternate embodiment of the present invention.

FIG. 12 is a top view of grating coupler demultiplexer 1200, according to an alternate embodiment of the present invention. Grating coupler demultiplexer 1200 includes grating couplers 1201, 1202, 1203, 1204 and 1205 in illuminated spot 1250. The grating couplers within the illuminated spot 1250 can have a variety of shapes and the circular gratings shown are examples of one possible shape. Within the grating couplers 1201, 1202, 1203 and 1204 shown in spot 1250 are respective elliptical light scattering elements 1211, 1212, 1213 and 1214. The elliptical light scattering elements can be used to enable the grating couplers to focus to a point in free space. Other techniques for designing a grating coupler to focus to a point in free space are known to those skilled in the art, such as controlling the phase relationship between adjacent couplers.

Each of the five grating couplers can be tuned to a different central wavelength. It's possible to use the smaller grating coupler 1205 to carry a control signal, since less sensitivity is required for a low data rate signal. The smaller grating coupler 1205 in the middle for connecting to a low data rate channel can be a circular grating coupler. Grating coupler demultiplexer 1200 can use circular grating couplers for polarization insensitivity with, for example, germanium heterojunction photodetectors in the middle of the grating couplers.

Each wavelength can be separated by about 20 nm and if a SOI substrate is used, the grating couplers can be formed in the SOI substrate by a partial etch process.

Figure 13:
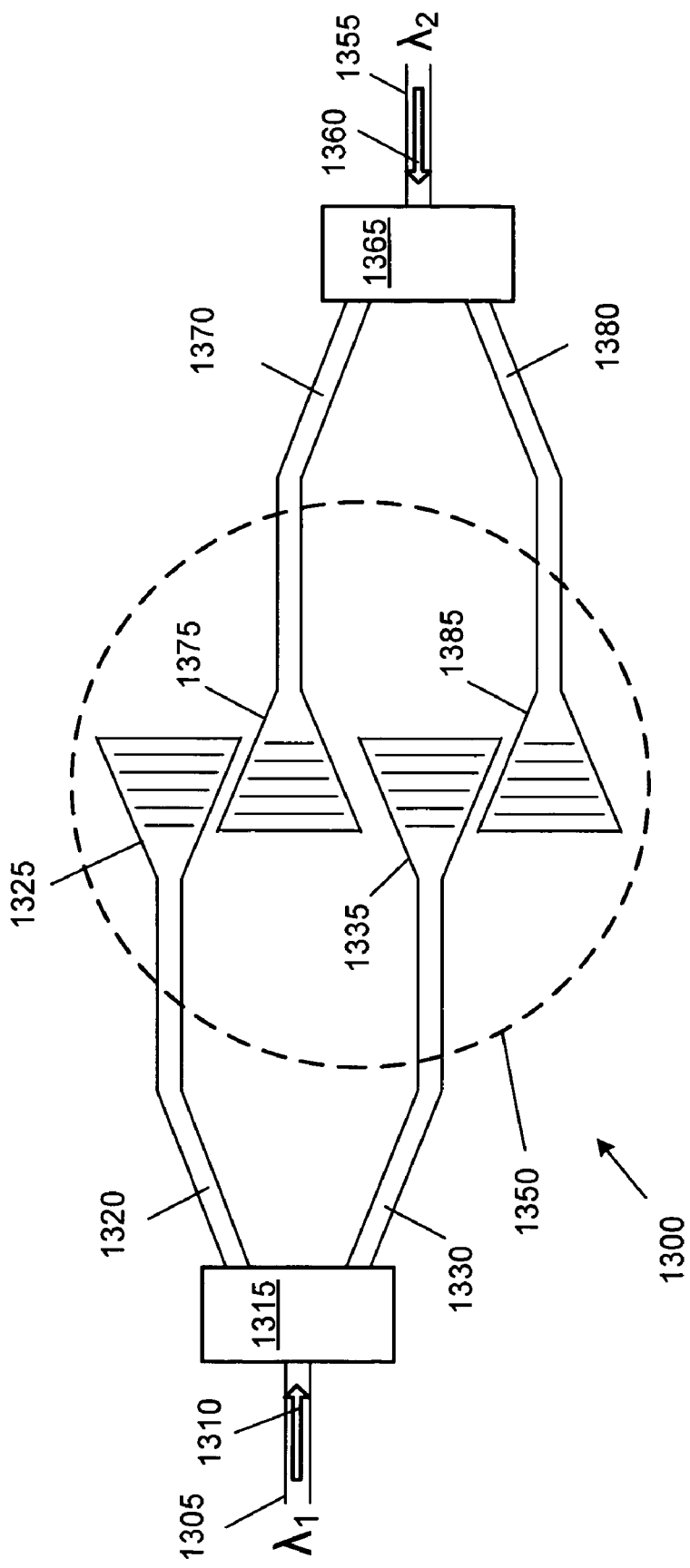
FIG. 13 is a top view of a grating coupler multiplexer, according to an embodiment of the present invention.

FIG. 13 is a top view of Grating coupler multiplexer 1300, according to an embodiment of the present invention. Grating coupler multiplexer 1300 is used to multiplex two or more channels of light at the transmit side of an optical fiber using several grating couplers in spot 1350. One light channel 1310 centered on wavelength $\lambda_1$ is connected on waveguide 1305 to splitter 1315. The outputs of splitter 1315 are connected on waveguides 1320 and 1330 to respective grating couplers 1325 and 1335 in grating coupler multiplexer 1300. A second light channel 1360 centered on wavelength $\lambda_2$ is connected on waveguide 1355 to splitter 1365. The outputs of splitter 1365 are connected on waveguides 1370 and 1380 to respective grating couplers 1375 and 1385 in grating coupler multiplexer 1300. There can be as many grating couplers per wavelength in grating coupler multiplexer 1300 as may be needed to transmit a multiplexed light to an optical fiber.

One factor that must be taken into consideration in the design of grating coupler multiplexer 1300 is that the light launched into an optical fiber has to be designed to be more or less "spotty," depending on the design of the grating coupler demultiplexer at the receive side of the optical fiber. If the grating coupler demultiplexer at the far end is not designed for "spotty" light, then the grating coupler multiplexer, at the transmit side has to launch light without no or only minimal light spots. But if certain grating couplers in the grating coupler demultiplexer at the far end are designed to receive spotty light from the fiber, then the fiber should be oriented to position the spotty light in the fiber to connect with the spotty light compatible grating couplers in the grating coupler demultiplexer.

In launching light into a multimode fiber, the light needs a broad ΔK for all the modes in the multimode fiber. This can be accomplished with a sufficiently sized grating coupler on the transmit side. As grating coupler size gets smaller, then ΔK gets broader. So a clustered group of grating couplers positioned on the transmit side would be essential. The transmit side grating couplers would be probably smaller than the receiver side grating couplers. It might also be desirable to use multiple grating couplers per wavelength on the transmit side to ensure uniform modal excitation. A grating coupler multiplexer of the present invention could also interface with a standard LX-4 type transmitter, but with the potential for higher speed operation.

In other embodiments of the present invention, an optical multiplexing and demultiplexing system can be made by combining separate transmit (Tx) and receive (Rx) grating couplers in an illuminated spot to provide simultaneous bidirectional propagation of multiple wavelengths of light through an optical fiber. The Rx group of grating couplers is connected to wavelengths of light received from an optical fiber and the Tx group of grating couplers is simultaneously connected to wavelengths of light that are directed into the same optical fiber.

A particularly advantageous aspect of the present invention is the ability to multiplex and demultiplex multiple channels of light with high speed data rates and with a compact design compatible with standard silicon and SOI substrates and CMOS electronic devices.

Although the present invention has been described in detail, it should be understood that various changes, substitutions and alterations can be made without departing from the spirit and scope of the invention.

I claim:

1. An optical multiplexing/demultiplexing system comprising a plurality of waveguide grating couplers on a substrate and an optical port,
    where the plurality of waveguide grating couplers are in the same optical path as light in the optical port, and are configured to couple light between a plurality of planar waveguides on the substrate and the optical port,
    the optical port contains signals propagating on a plurality of wavelengths,
    a first subset of the plurality of waveguide grating couplers is tuned to primarily couple light to/from a first subset of the plurality of wavelengths,
    one of the plurality of waveguide grating couplers is tuned to primarily couple one wavelength of light from the optical port,
    said optical multiplexing/demultiplexing system further comprising a plurality of photodetectors,
    where the one wavelength of light coupled to one of the plurality of waveguide grating couplers is coupled to one of the plurality of photodetectors, and
    said optical multiplexing/demultiplexing system further comprising a mirror disposed on top of the one of the plurality of photodetectors,
    where the mirror substantially blocks incident light from impinging on top of the one photodetector.

2. An optical multiplexing/demultiplexing system comprising a plurality of waveguide grating couplers on a substrate and an optical port,
    where the plurality of waveguide grating couplers are in the same optical path as light in the optical port, and are configured to couple light between a plurality of planar waveguides on the substrate and the optical port,
    the optical port contains signals propagating on a plurality of wavelengths,
    a first subset of the plurality of waveguide grating couplers is tuned to primarily couple light to/from a first subset of the plurality of wavelengths,
    one of the plurality of waveguide grating couplers is tuned to primarily couple one wavelength of light from the optical port,
    said optical multiplexing/demultiplexing system further comprising a plurality of photodetectors,
    where the one wavelength of light coupled to one of the plurality of waveguide grating couplers is coupled to one of the plurality of photodetectors, and
    wherein the one photodetector is positioned in the center of a waveguide grating coupler.

3. An optical multiplexing/demultiplexing system comprising a plurality of waveguide grating couplers on a substrate and an optical port,
    where the plurality of waveguide grating couplers are in the same optical path as light in the optical port, and are configured to couple light between a plurality of planar waveguides on the substrate and the optical port,
    the optical port contains signals propagating on a plurality of wavelengths,
    a first subset of the plurality of waveguide grating couplers is tuned to primarily couple light to/from a first subset of the plurality of wavelengths,
    one of the plurality of waveguide grating couplers is tuned to primarily couple one wavelength of light from the optical port,
    said optical multiplexing/demultiplexing system further comprising a plurality of photodetectors,
    where the one wavelength of light coupled to one of the plurality of waveguide grating couplers is coupled to one of the plurality of photodetectors, and
    wherein the one photodetector is positioned in a ring surrounding a waveguide grating coupler.

4. An optical apparatus comprising a plurality of waveguide grating couplers on a substrate optically coupled to an optical fiber,
    where first and second waveguide grating couplers of the plurality of waveguide grating couplers are optically coupled to respective first and second wavelengths of light propagating in the optical fiber,
    wherein at least one of the plurality of waveguide grating couplers receives a wavelength of light coupled to it from the optical fiber,
    said optical apparatus further comprising at least one photodetector on the substrate,
    where the wavelength of light received by the at least one waveguide grating coupler is coupled to the photodetector, and
    said optical apparatus further comprising a mirror disposed on top of the at least one photodetector,
    where the mirror substantially blocks incident light from impinging on top of the photodetector.

5. An optical apparatus comprising a plurality of waveguide grating couplers on a substrate optically coupled to an optical fiber,
    where first and second waveguide grating couplers of the plurality of waveguide grating couplers are optically coupled to respective first and second wavelengths of light propagating in the optical fiber, wherein at least one of the plurality of waveguide grating couplers receives a wavelength of light coupled to it from the optical fiber, and wherein the at least one photodetector is positioned in the center of the at least one waveguide grating coupler.

6. An optical apparatus comprising a plurality of waveguide grating couplers on a substrate optically coupled to an optical fiber, where first and second waveguide grating couplers of the plurality of waveguide grating couplers are optically coupled to respective first and second wavelengths of light propagating in the optical fiber, wherein at least one of the plurality of waveguide grating couplers receives a wavelength of light coupled to it from the optical fiber, and wherein the at least one photodetector is positioned in a ring surrounding the at least one waveguide grating coupler.

7. An optical apparatus on a substrate comprising:

a first waveguide grating coupler, a first photodetector optically coupled to the first grating coupler and a mirror disposed on top of the first photodetector, where the mirror blocks incident light from impinging on top of the first photodetector, wherein the mirror is placed on the same side of the substrate as a source of incident light.

8. The optical apparatus of claim 7, and further comprising an optical fiber optically coupled to the first grating coupler.

9. The optical apparatus of claim 8, and further comprising a plurality of wavelengths of light propagating in the optical fiber.

10. The optical apparatus of claim 8, wherein the optical fiber is selected from a group consisting of: a single mode fiber, a multimode fiber and a polarization maintaining fiber.

11. An optical apparatus on a substrate comprising:

a first waveguide grating coupler, a first photodetector optically coupled to the first grating coupler and a mirror disposed on top of the first photodetector, where the mirror blocks incident light from impinging on top of the first photodetector, wherein the first photodetector is positioned in the center of the first grating coupler.

12. An optical apparatus on a substrate comprising:

a first waveguide grating coupler, a first photodetector optically coupled to the first grating coupler and a mirror disposed on top of the first photodetector, where the mirror blocks incident light from impinging on top of the first photodetector, wherein the first photodetector is positioned in a ring surrounding the first grating coupler.

* * * * *